Feb. 8, 1927. 1,616,801
A. G. HOOVENS
LIGHTNING ROD
Filed Aug. 18, 1921
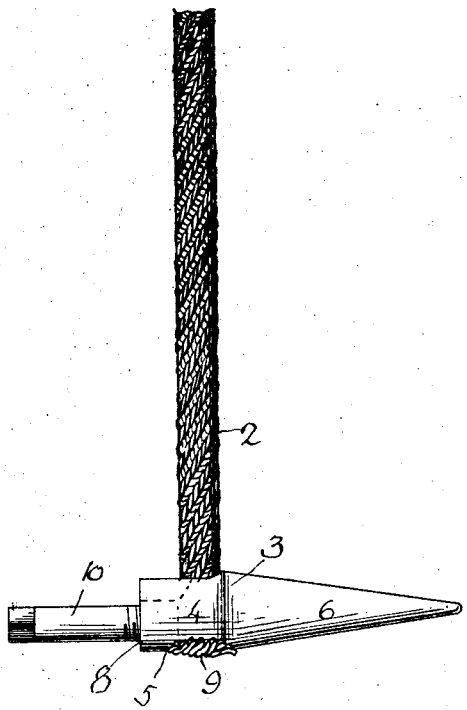
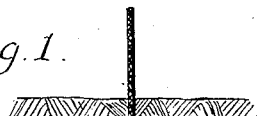
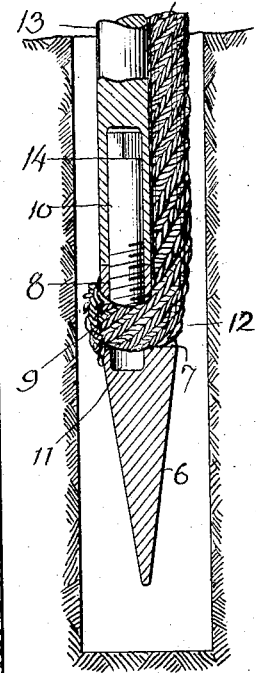
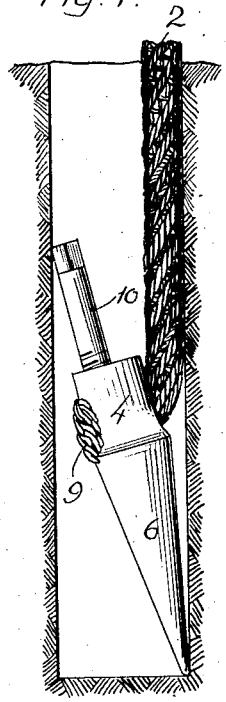
Inventor
A. G. Hoovens.
E. W. Anderson Jr.
By
Attorney Patented Feb. 8, 1927.

1,616,801

UNITED STATES PATENT OFFICE.

AMASA G. HOOVENS, OF GOSHEN, INDIANA.

LIGHTNING ROD.

Application filed August 18, 1921. Serial No. 493,398.

Figure 1 is a side view of the invention, as in use.

Figure 2 is a similar view on a larger scale.

Figure 3 is a side view of the invention, being inserted in the ground and showing the insertion rod.

Figure 4 is a similar view with the insertion rod withdrawn.

The invention has relation to improvements in anchoring devices for lightning rod and other cables, and it consists in the novel construction and combination of parts as hereinafter set forth.

In the accompanying drawings illustrating the invention, the numeral 2 designates the lightning rod cable, and 3 is the anchoring device having a body 4, provided with an upper transverse perforation 5, and a lower pointed portion 6, said body having an upper longitudinal threaded aperture 8 intersecting said transverse perforation and an upper longitudinal lateral notch 7 also intersecting said perforation.

The copper cable 2 has its ground end engaged within said transverse perforation 5, and clinched at 9, a set screw 10 being engaged with the aperture 8 and engaging the cable laterally, the aperture 8 being extended at 11 on the inner side of the aperture 5, and pressure of the screw 10 causing the strands of the cable to be pressed partly within the extension 11, as shown in Figure 3 of the drawings to thereby hold the cable more securely.

In the use of the invention, a hole is made in the ground by a pointed iron bar or other means to a depth of from eight to ten feet to permanent moisture, the hole being sufficiently large to permit the passage of the anchoring device with the cable attached thereto. This bar being withdrawn, the lightning rod cable with the anchor secured at the lower end thereof and parallel with the cable, made possible by a right angle bend 12 in the latter, is then lowered down to this hole, a rod 13 of slender nature or small cross section and having a longitudinal recess 14 at its lower end engaging the set screw 10 or within which said screw is received, being utilized to hold the anchoring device in the upright or parallel position stated and being lowered therewith.

The rod 13 is then withdrawn, leaving the anchoring device at the bottom of the hole and the cable in proper position, as shown in Figure 4 of the drawings. Any upward strain or pull upon the lightning rod cable causes the anchoring device to assume a position at right angles to the cable, as shown in Figures 1 and 2, engaging the ground at the sides of the hole and effectually preventing any rise of the cable, which would lower its efficiency.

The pointed portion of the anchoring device and the set screw thereof each projects about the same distance laterally of the cable in said right angle position, in engagement with the ground and resists upward movement of the cable, being adapted to engage the ground as stated.

The notch 7 is adapted to receive the cable and enables the same to be brought more nearly in line with the anchoring device in the upright position of the latter, when being lowered with the cable into the hole, or in other words facilitates the lowering of the device and cable into the hole.

The set screw 10 serves the double purpose of securing the cable and of enabling the device to be held upright by the rod 13 engaging the same when being lowered in the hole, and serves a third purpose of resisting upward movement of the anchoring device and cable, owing to its lateral projection into engagement with the ground.

I claim:—

1. In an anchoring device for lightning rod cables, an elongated body having at one end a pointed portion and at the other end a transverse perforation for the cable end and a longitudinal threaded aperture offset to one side of said body and intersecting said perforation, and a set screw for the cable end engaging said threaded aperture and projecting outwardly in line with said body and adapted to cooperate with an imbedding tool in imbedding the device in the ground, said body having at one end a longitudinal lateral notch parallel to said aperture and intersecting said transverse perforation and adapted to receive the cable, said set screw and said pointed portion projecting each laterally of said transverse perforation to about the same extent to thereby resist upward movement of the imbedded device.

2. As an article of manufacture, an anchor for electrical conductors comprising a body having at one end a reduced offset shank and having a transverse opening and a communicating longitudinal opening, said openings being adapted to receive a conductor cable, said shank and said longitudinal opening being parallel to the longitudinal axis of said body, the latter having a driving face substantially in the longitudinal axis of the body between said shank and longitudinal opening, and said shank being adjustable to secure a conductor cable in said opening.

In testimony whereof I affix my signature.

AMASA G. HOOVENS.